Patented Jan. 8, 1946

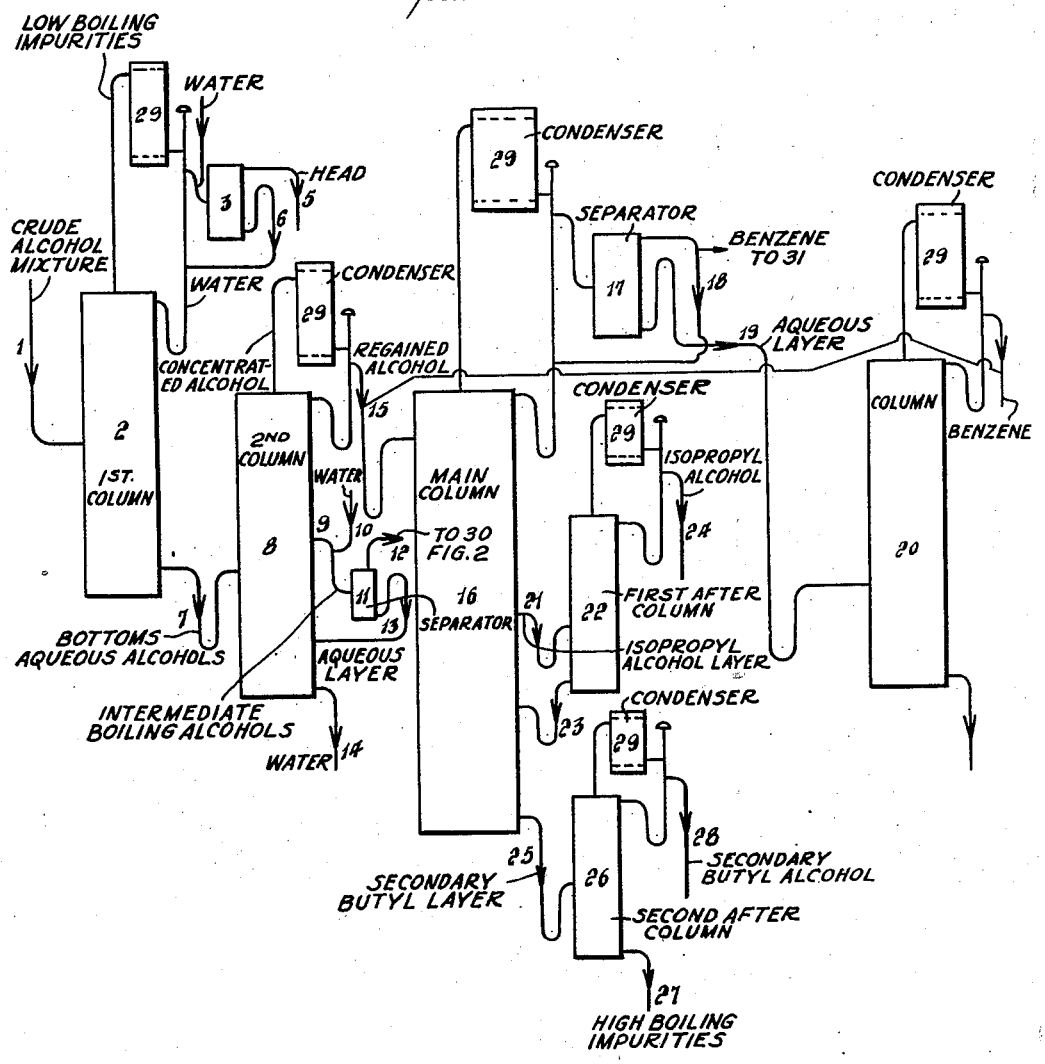

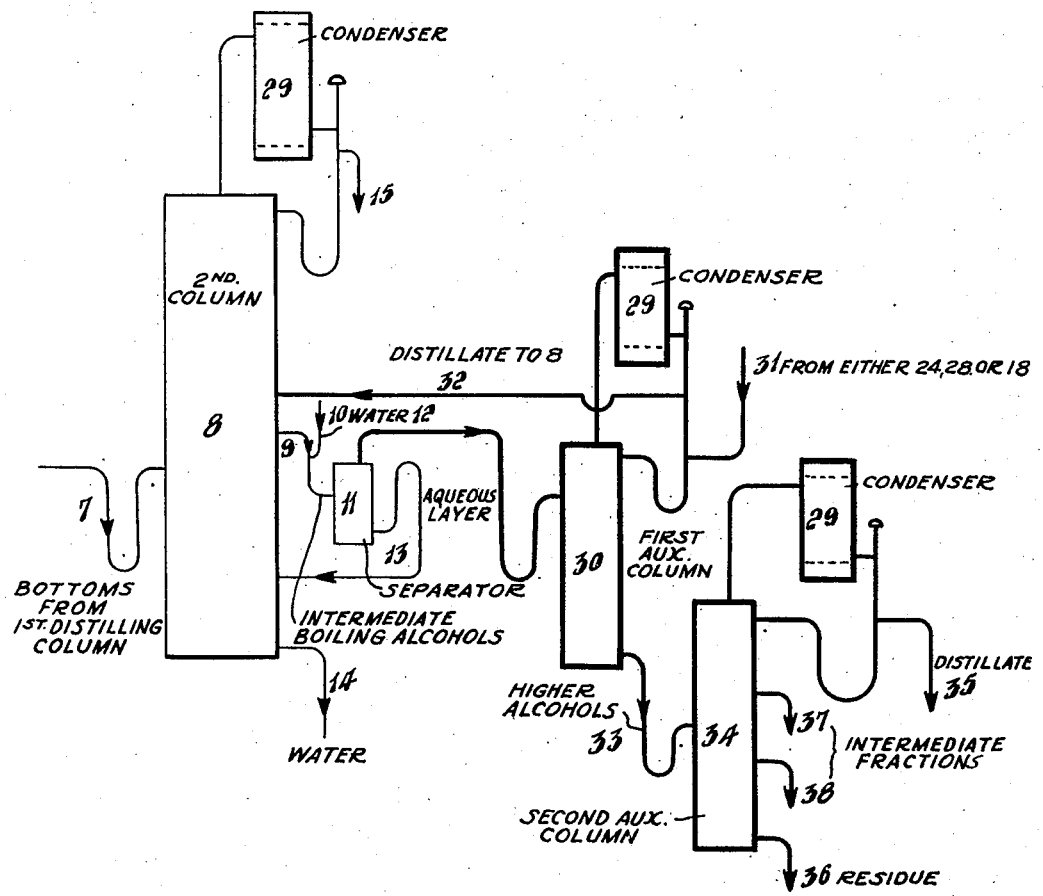

2,392,534

UNITED STATES PATENT OFFICE 2,392,534

PROCESS OF DISTILLING ALCOHOLS

Otto von Keussler, Darmstadt, Germany; vested in the Alien Property Custodian

Application July 18, 1941, Serial No. 403,046
In Poland May 20, 1940

2 Claims. (Cl. 202—42)

This invention relates to a process of continuously purifying and separating a mixture of higher alcohols by distillation.

In further working up the waste gases of petroleum cracking, the so-called "Restgase" of the Fischer-Tropsch procedure, and similar industrial gas mixtures containing propylene and butylene, there are formed aqueous mixtures of alcohols (vide United States Patent 2,080,064, page 1, lines 10–24, 48 and following) mainly composed of isopropyl and secondary butyl alcohols. Although the boiling points of these two alcohols are relatively far apart—isopropyl alcohol boils at 82.4°, sec.-butyl alcohol at 99.6°—they cannot be separated from aqueous mixtures by distillation, as both alcohols form azeotropically boiling distillates with water. Thus isopropyl alcohol boils with 12% by weight of water at 80.4°, sec.-butyl alcohol with 32% by weight of water at 88.5° azeotropically. If both alcohols are present in the aqueous mixture, there comes over at its rectification an alcohol mixture which, according to the relative amount of the alcohols, contains between 15 and 25% water and boils at 83–87°.

The said industrial alcohol mixtures contain various amounts of impurities, e. g., still higher sec. alcohols, the ethers corresponding to the alcohols, and compounds not known yet in detail. These impurities partly form, as well with isopropyl alcohol, sec.-butyl alcohol, and water, as also among themselves, azeotropically boiling mixtures that interfere with the rectification of the crude alcohol mixture.

It was found that out of the said industrial mixtures pure isopropyl and sec.-butyl alcohol may be obtained, by proceeding according to the invention as follows (vide Fig. 1).

The crude alcohol mixture used as starting material is first fed continuously to a first column for preliminary purification 2, at the top of which the low-boiling impurities are drawn off as distillate, washed out in a separator 3, and separated into two layers. The upper layer (the head) may be separated into its components by rectification, as described in detail below, the lower aqueous layer is fed again to the column for preliminary purification 2.

From the bottom of the fore-column the aqueous alcohol mixture freed from low-boiling impurities continuously runs to a second column for preliminary purification 8, at the top of which the concentrated alcohol mixture boiling azeotropically with water is drawn off. The main quantity of water runs off as singlings ("Lutterwasser") at the bottom of this column through line 14. Between bottom and top of the column there are concentrating in an intermediate zone medium-boiling impurities, which are drawn off at 9.

The distillate of the second fore-column 8 is continuously fed to the main column 16, where it is dehydrated by azeotropic distillation with addition of one of the well-known "entraining agents," and then separated into its components, isopropyl alcohol and sec.-butyl alcohol. In this main column there are three zones to be distinguished. In the upper zone of the column the dehydration by azeotropic distillation is going on, in the intermediate zone the isopropyl alcohol is concentrating, and in the lower part of the column the sec.-butyl alcohol is freed from isopropyl alcohol.

The isopropyl alcohol concentrated in the intermediate zone is fed to an after-column 22 and drawn off as a purified anhydrous distillate, whereas the sec.-butyl alcohol collecting at the bottom of this column and still containing isopropyl alcohol is carried back to the main column 16.

At the bottom of the main column 16 the anhydrous sec.-butyl alcohol is collecting. It is rectified in a second after-column 26, in such a manner that as distillate the anhydrous and rectified alcohol appears, whereas high-boiling impurities, if any, are drawn off at the bottom of this column.

As a matter of course all the arrangements and auxiliary measures known from the rectification technique may be applied in carrying out the above process, e. g., direct and indirect heating of the columns respectively, prewarming of the cold liquids entering the apparatus by the hot ones leaving it, automatic control of the amounts of liquid continuously entering the columns and apparatus and leaving them, carrying back of the alcohols obtained by azeotropic dehydration from the aqueous layers into the apparatus, neutralisation of the crude alcohol mixture and fractions during operation etc.

The head from the first fore-column 2 may be separated into its components by rectification as follows:

After distilling off of the lowest-boiling components, there appears without addition of an "entraining agent" an azeotropically boiling mixture, which is separated into two layers in a separator. For better separation water is suitably added to the azeotropic distillate before entering the separating funnel. The lower aqueous layer is carried back into the first fore-column 2.

The upper layer is collected as a separate fraction. If there is no more water in the distillate, the further higher-boiling components of the head go over according to their boiling points or to the azeotropic boiling points formed between them, respectively, in an anhydrous state, and may thus be separated into further fractions. In case of larger amounts of head the separation of the head according to the above principles may also be carried out in continuous operation.

The medium-boiling impurities drawn off from the second fore-column 8 at 9 are further treated as follows (vide Fig. 2).

At first they are separated into two layers in a separator 11 after addition of water through line 10. The lower aqueous layer is carried over again to column 8 through line 13. The upper layer is first carried over through line 12 to a first auxiliary column 30, at the top of which an alcohol mixture of isopropyl- and butyl alcohol boiling azeotropically with water and at the bottom of which a practically anhydrous mixture of higher-boiling alcohols is drawn off. If the amount of isopropyl and butyl alcohol dissolved in the upper layer is not sufficient for dehydration, either anhydrous isopropyl alcohol from 24, or anhydrous butyl alcohol from 28, or benzene from 18 is fed to the top of the auxiliary column 30 through line 31. The distillate of column 30 is carried back to column 8 through line 32. The added alcohol or benzene, respectively, thus performs a circular course throughout the apparatus.

The practically anhydrous, higher-boiling alcohols drawn off at the bottom of column 30 through line 33 may be carried over to a second auxiliary column 34 and here be separated into two fractions at 35 as distillate and at 36 as residue. At 37 and 38 intermediate fractions may be taken, if need be.

*Example*

1,000 litres alcohol mixture per hour, obtained from the "Restgase" of the Fischer-Tropsch procedure, containing 70 vol. of water, are continuously carried through line 1 to column 2. One part of the distillate goes back to column 2 as reflux, the other part is carried over to the separator 3 after addition of water through line 4 and here separates into two layers. The upper layer (the head) is drawn off at 5, the aqueous layer returns through line 6 to column 2. The alcohol mixture free from head passes at the bottom of column 2 through line 7 to column 8. The impurities concentrating in the central part of column 8 are drawn off at 9 and separated into two layers in the separator 11 after addition of water through line 10. The washed-out impurities are drawn off at 12, the aqueous layer returning through line 13 to column 8. The main quantity of water leaves the apparatus through line 14.

The alcohol mixture concentrated to a water content of 15–20% is carried over to column 16 through line 15. In the upper part of the column the alcohol mixture is dehydrated by azeotropic distillation, e. g., with benzene. The ternary distillate is separated into two layers, as usual, in separator 17. The benzene returns to column 16 through line 18. The aqueous layer is carried over to column 20 through line 19 for regaining of the alcohol contained in it. The regained alcohol is carried back into the operating circle, e. g., into line 15.

The isopropyl alcohol concentrating in the central part of column 16 goes through line 21 to column 22, whereas the sec.-butyl alcohol still contained in it returns to column 16 through line 23. About 180 litres of purified anhydrous isopropyl alcohol are obtained through line 24 as distillate every hour.

From the bottom of column 16 the sec.-butyl alcohol runs to column 26 through line 25. At the bottom of this column any high-boiling impurities, if still present, may be removed through line 27. The purified anhydrous sec.-butyl alcohol in an amount of 100 litres per hour is obtained as distillate through line 28. To every column there belongs a condenser 29. The line carrying off the condensate is provided with a ventilation in the usual manner.

I claim:

1. The process of purifying and separating a mixture of secondary alcohols including isopropyl, secondary butyl alcohols and higher alcohols obtained from industrial gas mixtures containing propylene and butylene by conversion of the olefins into alcohols which comprises distilling off from the first distilling zone the low boiling alcoholic mixture from the initial mixture, condensing the distillate, washing the condensate therefrom and separating the washed condensate into two layers, returning the lower layer to the first distilling zone, drawing off the bottoms of the first distilling zone into a second distilling zone, distilling therefrom the lighter fraction including isopropyl and secondary butyl alcohol, condensing and conducting the distillate to a main distilling zone, distilling in the main zone in the presence of benzene whereby the isopropyl and secondary butyl alcohol are separately collected as a side stream and as bottoms respectively.

2. The process according to claim 1 which comprises drawing off from said second distilling zone a concentrated intermediate fraction, washing impurities therefrom, conducting said washed intermediate fraction to a first auxiliary zone, introducing into said auxiliary zone the deficient fraction of the group consisting of isopropyl alcohol, secondary butyl alcohol and benzene, azeotropically distilling said mixture, returning the condensed distillate to the second distilling zone, drawing off the bottoms of the said auxiliary distilling zone to a secondary auxiliary distilling zone, distilling and separating the condensate into fractions including higher alcohols and residue.

OTTO von KEUSSLER.